US010233380B1

(12) United States Patent
Wagle et al.

(10) Patent No.: US 10,233,380 B1
(45) Date of Patent: Mar. 19, 2019

(54) WELL TREATMENT FLUID HAVING AN ACIDIC NANOPARTICLE BASED DISPERSION AND A POLYAMINE

(71) Applicant: Saudi Arabian Oil Company, Dhahran (SA)

(72) Inventors: Vikrant Wagle, Abqaiq (SA); Abdullah Al-Yami, Dhahran (SA); Zainab Alsaihati, Saihat (SA); Abdulaziz Alhelal, Alhsa Hofuf (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/700,886

(22) Filed: Sep. 11, 2017

(51) Int. Cl.
| | |
|---|---|
| C08K 9/06 | (2006.01) |
| C09J 11/06 | (2006.01) |
| C09K 8/467 | (2006.01) |
| C09K 8/508 | (2006.01) |
| C09K 8/516 | (2006.01) |
| E21B 21/00 | (2006.01) |
| E21B 33/138 | (2006.01) |
| E21B 43/20 | (2006.01) |

(52) U.S. Cl.
CPC ............ C09K 8/5083 (2013.01); C09K 8/516 (2013.01); E21B 21/003 (2013.01); E21B 33/138 (2013.01); C09K 2208/10 (2013.01); E21B 43/20 (2013.01)

(58) Field of Classification Search
CPC .................................. C08K 9/04; C09J 11/06
See application file for complete search history.

(56) References Cited

U.S. PATENT DOCUMENTS

| | | | |
|---|---|---|---|
| 2,618,570 | A | 11/1952 | Blackburn |
| 3,032,499 | A | 5/1958 | Brown |
| 3,435,899 | A | 4/1969 | McLaughlin et al. |
| 3,642,624 | A | 2/1972 | Howland et al. |
| 4,042,031 | A | 8/1977 | Knapp |
| 4,482,381 | A | 11/1984 | Spitz et al. |
| 4,569,694 | A | 2/1986 | Spitz et al. |
| 5,320,171 | A | 6/1994 | Laramay |
| 5,762,141 | A | 6/1998 | Hutchins et al. |
| 5,849,581 | A | 12/1998 | Amaral et al. |
| 5,951,910 | A | 9/1999 | Skaggs et al. |
| 6,085,839 | A | 7/2000 | Wyant et al. |
| 6,849,581 | B1 | 2/2005 | Thompson et al. |
| 7,013,973 | B2 | 3/2006 | Danican et al. |
| 7,219,735 | B2 | 5/2007 | Smith et al. |
| 7,458,424 | B2 | 12/2008 | Odeh et al. |
| 7,563,750 | B2 | 7/2009 | Eoff et al. |
| 7,703,522 | B2 | 4/2010 | Huang |
| 7,759,292 | B2 | 7/2010 | Eoff et al. |
| 7,875,575 | B2 | 1/2011 | Huang et al. |
| 7,934,557 | B2 | 5/2011 | Nguyen |
| 7,954,549 | B2 | 6/2011 | Lende et al. |
| 8,053,397 | B2 | 11/2011 | Huang et al. |
| 8,071,666 | B2 | 12/2011 | Barthel et al. |
| 8,230,919 | B2 | 7/2012 | Goodwin et al. |
| 9,004,169 | B2 | 4/2015 | Huang et al. |
| 9,045,965 | B2 | 6/2015 | Patil et al. |
| 9,133,386 | B2 | 9/2015 | Kumar et al. |
| 9,499,735 | B2 | 11/2016 | Vo et al. |
| 9,649,618 | B2 | 5/2017 | Wang et al. |
| 9,708,523 | B2 | 7/2017 | Allison et al. |
| 2004/0031611 | A1 | 2/2004 | Huang et al. |
| 2007/0167547 | A1* | 7/2007 | Tammaji Kulkarni ...................... C08K 5/0083 524/284 |
| 2007/0238088 | A1 | 10/2007 | Rubinsztajn et al. |
| 2008/0066909 | A1 | 3/2008 | Hutchins et al. |
| 2009/0145607 | A1 | 6/2009 | Li |
| 2010/0256023 | A1 | 10/2010 | Pauls et al. |
| 2011/0094746 | A1 | 4/2011 | Allison et al. |
| 2013/0153232 | A1 | 6/2013 | Bobier et al. |
| 2014/0349894 | A1 | 11/2014 | Quintero et al. |
| 2016/0024371 | A1 | 1/2016 | Vo et al. |
| 2016/0068664 | A1 | 3/2016 | Suemura et al. |
| 2016/0199810 | A1 | 7/2016 | Goeppert et al. |
| 2016/0201433 | A1 | 7/2016 | Kalgaonkar et al. |
| 2016/0201443 | A1 | 7/2016 | Nguyen et al. |
| 2016/0280982 | A1 | 9/2016 | Boul et al. |
| 2016/0376490 | A1 | 12/2016 | Salla et al. |
| 2017/0009120 | A1 | 1/2017 | Yang et al. |
| 2017/0058181 | A1 | 3/2017 | Frantz et al. |
| 2018/0223152 | A1 | 8/2018 | Wagle et al. |

FOREIGN PATENT DOCUMENTS

| | | | |
|---|---|---|---|
| CN | 103173094 | A * | 6/2013 |
| CN | 104434542 | A * | 3/2015 |
| CN | 105504900 | A * | 4/2016 |

(Continued)

OTHER PUBLICATIONS

Chu et al., "Glycidoxypropyltrimethoxysilane Modified Colloidal Silica Coatings", Materials Research Society, 1996, pp. 221-225, vol. 435, Materials Research Society.
International Search Report and Written Opinion for related PCT application PCT/US2018/049643 (SA5725) dated Nov. 26, 2018; pp. 1-14.
International Search Report and Written Opinion for related PCT application PCT/US2018/049821 (SA5728) dated Dec. 10, 2018; pp. 1-14.

(Continued)

Primary Examiner — Zakiya W Bates

(74) Attorney, Agent, or Firm — Bracewell LLP; Constance G. Rhebergen; Brian H. Tompkins

(57) ABSTRACT

A well treatment fluid having an acidic nanosilica dispersion and a polyamine activator and methods of reducing water production using the well treatment fluid. The acidic nanosilica dispersion and the polyamine activator may form a gelled solid after interaction over a period.

12 Claims, 3 Drawing Sheets

(56) References Cited

FOREIGN PATENT DOCUMENTS

| CN | 105600793 A | * | 5/2016 |
|---|---|---|---|
| GB | 2399364 A | | 9/2004 |
| WO | 2014085770 A1 | | 6/2014 |
| WO | WO2015041703 A1 | | 3/2015 |
| WO | WO2016057027 A1 | | 4/2016 |

OTHER PUBLICATIONS

International Search Report and Written Opinion for related PCT application PCT/US2018/049824 (SA5729) dated Dec. 10, 2018; pp. 1-14.
Ramasamy J. et al., "Two Component Lost Cireclation Material for Controlling Seepage to Moderate Losses", Society of Petroleum Engineers, SPE-1881011-MS, 2017, pp. 1-10.

\* cited by examiner

200

300

WELL TREATMENT FLUID HAVING AN ACIDIC NANOPARTICLE BASED DISPERSION AND A POLYAMINE

BACKGROUND

Field of the Disclosure

The present disclosure generally relates to controlling lost circulation in a well during drilling with a drilling fluid and reducing water production during production from the well. More specifically, embodiments of the disclosure relate to lost circulation materials (LCMs) and well treatment fluids.

Description of the Related Art

Various challenges are encountered during drilling and production operations of oil and gas wells. For example, fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor losses (for example less than 10 barrels/hour (bbl/hr)), also referred to as seepage loss, to severe (for example, greater than 100 bbl/hr), or greater, also referred to referred to as complete fluid loss. As a result, the service provided by such fluid is more difficult or costly to achieve.

Such lost circulation can be encountered during any stage of operations and occurs when drilling fluid (or drilling mud) pumped into a well returns partially or does not return to the surface. While de minimis fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

In another example, after a well is completed and becomes a producing well, water production from the well may cause significant economic drawbacks. High water production rates may cause a reduction in well productivity, an increase operating expenditures, and can completely block production from wells. Consequently, controlling and eliminating unwanted water influx into oil or gas wells is a major concern of producers. The water produced in a well may be the result of a water-producing zone communicating with the oil or gas producing zone by fractures, high-permeability streaks, fissures, vugs, or the like. Water production may also be caused by occurrences such as water coning, water cresting, bottom water, and channeling at the wellbore. Such water production is typically produced at the expense of oil or gas recovery, and, in severe cases, the water influx may be so great that oil or gas production is choked off completely.

SUMMARY

Lost circulation materials (LCMs) are used to mitigate lost circulation by blocking the path of the drilling mud into the formation. The type of LCM used in a lost circulation situation depends on the extent of lost circulation and the type of formation. Lost circulation materials may be classified into different categories, such as fibrous materials, flaky materials, granular materials, gel type materials, cross-linking polymers, and loss control slurries. Such materials are frequently used either alone or in combination to control loss of circulation. The costs incurred in lost circulation situations may be due to lost time, losses of drilling fluids, and losses of production. Existing LCMs may perform poorly in mitigation and prevention of moderate lost circulation and seepage type lost circulation, and may not be suitable for controlling severe loss of circulation. Costs incurred in loss circulation situations may be due to losses of drilling fluids, losses of production, and the costs of LCMs.

In enhanced recovery techniques such as water flooding, an aqueous flood or displacement fluid is injected under pressure into an oil-containing subterranean formation by way of one or more injection wells. The flow of the aqueous fluid through the formation displaces oil or gas and drives it to one or more producing wells. However, the aqueous displacement fluid tends to flow through the most permeable zones in the subterranean formation such that less permeable zones containing oil or gas are bypassed. This uneven flow of the aqueous displacement fluid through the formation reduces the overall yield of hydrocarbons from the formation. Enhanced recovery problems caused by permeability variations in subterranean formations have been corrected by reducing the permeability of the subterranean formation flow paths. The techniques utilized to accomplish this reduction in the permeability of high permeability zones are may be referred to as "conformance control techniques." Decreasing excess water production increases the production water/oil ratio ("WOR"), thus lowering water-handling cost. As oil production increases and water production decreases, conformance control techniques can extend a well's economic life and increase return on investment (ROI). Existing techniques for controlling water production in subterranean formations include the use of gelatin-forming polymers, concrete resin barriers, and hydrophilic polymers. However, existing techniques may be unstable at high temperatures or in the presence of certain chemicals (for example, acids and brines), resulting in decomposition or degradation and reducing or eliminating their effectiveness. Moreover, some polymers used for controlling water production may be environmentally damaging.

In one embodiment, a method to reduce water production in a treatment zone in a wellbore is provided. The method includes introducing a treatment fluid into the wellbore such that the treatment fluid contacts the treatment zone and reduces the water production in the treatment zone, such that the treatment fluid includes an acidic nanosilica dispersion and a polyethylene polyamine. In some embodiments, the treatment fluid consists of the acidic nanosilica dispersion and the polyethylene polyamine. In some embodiments the polyethylene polyamine includes at least one of diethylenetriamine, ethylenediamine, tetraethylenepetamine (TEPA), triethylentetramine, pentaethylenehexamine (PEHA), and hexaethyleneheptamine (HEHA). In some embodiments, the polyethylene polyamine is in an amount in the range of 0.1 percent by volume of the total volume (v/v %) to 20 v/v %. In some embodiments, the method includes maintaining the acidic nanosilica dispersion and polyethylene polyamine in contact with the treatment zone for a contact period, such that the acidic nanosilica dispersion forms a gelled solid. In some embodiments, the contact period is in a range of 0.5 hours to 24 hours. In some embodiments, the treatment zone has a temperature that is at least 100° F. In some embodiments, the method includes mixing the acidic nanosilica dispersion and the polyethylene polyamine to form the treatment fluid at the surface before introducing the treatment fluid into the wellbore. In some embodiments, the treatment fluid includes at least one of calcium carbonate particles, fibers, mica, and graphite. In some embodiments, the fibers include at least one of polyethylene polyamine fibers, polypropylene fibers, starch fibers, polyketone fibers, ceramic fibers, glass fibers and nylon fibers. In some embodiments, the acidic nanosilica dispersion is stabilized by a cationic polymer. In some embodiments, the acidic nanosilica dispersion is stabilized by a carboxylic acid. In some embodiments, the acidic nanosilica dispersion is stabilized by acetic acid.

In another embodiment, a treatment fluid for reducing water production in a treatment zone in a wellbore is provided that includes an acidic nanosilica dispersion and a polyethylene polyamine selected to form a gelled solid after interaction with the acidic nanosilica dispersion for a period. In some embodiments, the period is in a range of 0.5 hours to 24 hours. In some embodiments, the polyethylene polyamine is in an amount in the range of 0.1 percent by volume of the total volume (v/v %) to 20 v/v %. In some embodiments, the polyethylene polyamine includes at least one of diethylenetriamine, ethylenediamine, tetraethylenepetamine (TEPA), triethylentetramine, pentaethylenehexamine (PEHA), hexaethyleneheptamine (HEHA). In some embodiments, the acidic nanosilica dispersion is stabilized by a cationic polymer. In some embodiments, the acidic nanosilica dispersion is stabilized by a carboxylic acid. In some embodiments, the acidic nanosilica dispersion is stabilized by acetic acid.

In another embodiment, a solid gelled material useful for reducing water production is provided. The solid gelled material forms by introducing an acidic nanosilica dispersion and a polyethylene polyamine to a treatment zone. The acidic nanosilica dispersion includes amorphous silicon dioxide and water, such that the nanosilica dispersion and the polyethylene polyamine contact the treatment zone having an elevated temperature for a period such that the solid gelled material forms. In some embodiments, the polyethylene polyamine is in an amount in the range of 0.1 percent by volume of the total volume (v/v %) to 20 v/v %. In some embodiments, the polyethylene polyamine includes at least one of diethylenetriamine, ethylenediamine, tetraethylenepetamine (TEPA), triethylentetramine, pentaethylenehexamine (PEHA), hexaethyleneheptamine (HEHA). In some embodiments, the polyethylene polyamine is introduced separately from the acidic nanosilica dispersion to the treatment zone. In some embodiments, the polyethylene polyamine and the acidic nanosilica dispersion are introduced simultaneously to the treatment zone. In some embodiments, the acidic nanosilica dispersion has an acidic pH, such that the pH value is increased after contact with the polyethylene polyamine.

DETAILED DESCRIPTION

Figure 1:
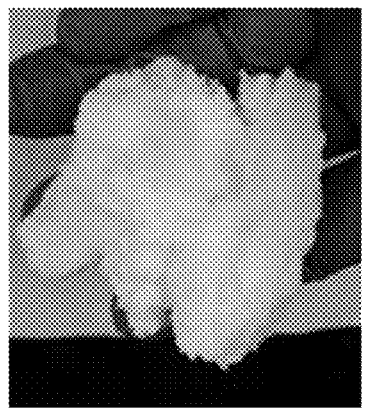
FIG. 1 is a photograph of a gelled solid formed by a mixture of an acidic nanosilica dispersion stabilized by acetic acid and a polyamine activator of ETHYLENEAMINE E-100 in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a lost circulation material (LCM) formed from an acidic nanosilica dispersion and a polyamine activator. The LCM may mitigate or prevent lost circulation in a well, as well as provide seepage control and minimize or prevent fluid loss. The acidic nanosilica dispersion may include amorphous silicon dioxide and an aqueous medium such as water. In some embodiments, the acidic nanosilica dispersion is stabilized by acetic acid or a cationic polymer. In other embodiments, the acidic nanosilica dispersion is stabilized by a carboxylic acid. In some embodiments, the polyamine activator may be a polyethylene polyamine and may include diethylenetriamine, ethylenediamine, tetraethylenepetamine (TEPA), triethylentetramine, pentaethylenehexamine (PEHA), hexaethyleneheptamine (HEHA), or any combinations thereof. For example, in some embodiments the polyamine activator may be a mixture of tetraethylenepentamine, pentaethylenehexamine, and hexaethyleneheptamine. In such embodiments, the mixture may include additional components. The acidic nanosilica dispersion may have a pH of less than 7 before interaction with the polyamine activator. The nanosilica dispersion and polyamine activator LCM may be introduced into a lost circulation zone in a wellbore, such that the nanosilica dispersion and polyamine activator LCM alters the lost circulation zone. The nanosilica dispersion and polyamine activator LCM may be allowed to interact with the lost circulation zone for a time period to enable the in-situ formation of a gelled solid as a result of the interaction between the acidic nanosilica dispersion and the polyamine activator.

Embodiments of the disclosure further include a treatment fluid formed from an acidic nanosilica dispersion and a polyamine activator. The treatment fluid may reduce or block water production resulting from, for example, water flooding operations for a producing well. The acidic nanosilica dispersion may include amorphous silicon dioxide and water. In some embodiments, the acidic nanosilica dispersion is stabilized by acetic acid or a cationic polymer. In other embodiments, the acidic nanosilica dispersion is stabilized by a carboxylic acid. In some embodiments, the polyamine activator may be a polyethylene polyamine and may include diethylenetriamine, ethylenediamine, tetraethylenepetamine (TEPA), triethylentetramine, pentaethylenehexamine (PEHA), hexaethyleneheptamine (HEHA), or any combinations thereof. For example, in some embodiments the polyamine activator may be a mixture of tetraethylenepentamine, pentaethylenehexamine, and hexaethyleneheptamine. In such embodiments, the mixture may include additional components. In some embodiments, the acidic nanosilica dispersion may have a pH of less than 7 before interaction with the activator. In some embodiments, the treatment fluid may be introduced into a treatment zone of a well, such as by pumping through a wellhead at a pump rate sufficient to position the treatment fluid at the treatment zone. The treatment fluid may be allowed to interact with the treatment zone for a period to enable the in-situ formation of a gelled solid as a result of the interaction between the nanosilica dispersion and the polyamine activator.

Acidic Nanosilica Dispersion and Polyamine Activator LCM

In some embodiments, an LCM includes an acidic nanosilica dispersion and a polyamine activator. The acidic nanosilica dispersion may include amorphous silicon dioxide and an aqueous medium. For example, in some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. The nanosilica dispersion include a stabilizer that stabilizes the nanosilica dispersion in a fluid state and ensures the nanosilica dispersion does not stiffen or harden into a solid. In some embodiments, the nanosilica dispersion may include a stabilizer of acetic acid. In other embodiments, the acidic nanosilica dispersion may include a stabilizer of a cationic polymer or a carboxylic acid. In some embodiments, the acidic nanosilica dispersion has a pH of less than 7 before interaction with the polyamine activator. In some embodiments, for example, an acidic nanosilica dispersion stabilized by acetic acid has a pH in the range of 2 to 4 at 25° C., a specific gravity of 1.21 and a viscosity of less than 30 centipoise (cP) at 25° C. In some embodiments, for example, an acidic nanosilica dispersion stabilized by a cationic polymer has a pH in the range of 2.5 to 4 at 25° C., a density of 1.21 (g/ml) a viscosity of less than 1000 cP at 25° C. In some embodiments, the nanosilica dispersion may be obtained from Evonik Corporation of Parsippany, N.J., USA.

The polyamine activator may be a polyethylene polyamine and may include diethylenetriamine, ethylenediamine, tetraethylenepetamine (TEPA), triethylentetramine, pentaethylenehexamine (PEHA), hexaethyleneheptamine (HEHA), or any combination thereof. For example, in some embodiments the polyamine activator may be a mixture of tetraethylenepentamine, pentaethylenehexamine, and hexaethyleneheptamine. In other embodiments, other polyamines capable of destabilizing the acidic nanosilica dispersion to form gelled solid may be used. In some embodiments, the volumetric ratio of the acidic nanosilica dispersion to the polyamine activator may be in the range of about 100:1 to about 140:1. For example, in some embodiments, the volumetric ratio of the acidic nanosilica dispersion to the polyamine activator may be about 120:1. In some embodiments, the polyamine activator may be in an amount in the range of about 0.1 percent by volume of the total volume (v/v %) to about 20 v/v %

In some embodiments, the acidic nanosilica dispersion and polyamine activator LCM may include additional materials. For example, in some embodiment the acidic nanosilica dispersion and polyamine activator LCM may include calcium carbonate particles, fibers (such as polyester fibers, polypropylene fibers, starch fibers, polyketone fibers, ceramic fibers, glass fibers or nylon fibers), mica, graphite, or combinations thereof.

The acidic nanosilica dispersion and polyamine activator LCM may be introduced (for example, by pumping) into a lost circulation zone in a wellbore to control lost circulation. In some embodiments, the acidic nanosilica dispersion and polyamine activator LCM may be allowed to interact with the lost circulation zone for a contact period. The contact period may be of a duration that enables formation of a solid as a result of the interaction between the acidic nanosilica dispersion and the polyamine activator. The formed solid may alter the lost circulation zone (for example, by entering and blocking porous and permeable paths, cracks, and fractures in a formation in the lost circulation zone, such as forming a structure in a mouth or within a fracture). In some embodiments, the polyamine and the acidic nanosilica dispersion may be introduced simultaneously to the lost circulation zone. In other embodiments, the polyamine activator may be introduced to the lost circulation zone separately from the acidic nanosilica dispersion.

In some embodiments, the contact period may be in the range of about 0.5 hours to about 24 hours. For example, in some embodiments the contact period may be about 16 hours. In some embodiments, the period may be selected based on the formation type of the lost circulation zone.

As shown infra, the acidic nanosilica dispersion and polyamine activator may form a gelled solid LCM after a contact period. The polyamine activate may increase the rate of gelation of the nanosilica dispersion as compared to using the nanosilica dispersion alone as an LCM. In some embodiments, the gelling of the nanosilica dispersion may be controlled by varying the concentration of the polyamine activator, and the gelling may be controlled by changing the pH of the LCM. For example, increasing concentrations of the polyamine activator may increase the pH of the LCM and increase the rate of gelation of the LCM. Additionally, the polyamine activator exhibits no precipitation with the nanosilica dispersion at elevated temperature, thus enabling use of the LCM composition as a single fluid pill (that is, without staged mixing of each component). Consequently, the delayed and controlled gelling of the nanosilica dispersion LCM may provide for easier pumping of the LCM. The acidic nanosilica dispersion and polyamine activator LCM may be used at elevated temperatures in a wellbore such as, for example, 100° F. or greater, such as 300° F. In some embodiments, the alkaline nanosilica dispersion and polyamine activator LCM may be used in lost circulation zones having temperatures less than 100° F., but such embodiments may have a greater time period for formation of the gelled solid as compared to lost circulation zones having greater temperatures. Moreover, the environmentally friendly properties of the acidic nanosilica dispersion and polyamine activator LCM may minimize or prevent any environmental impact and effect on ecosystems, habitats, population, crops, and plants at or surrounding the drilling site where the acidic nanosilica dispersion and polyamine activator LCM is used.

Acidic Nanosilica Dispersion and Polyamine Activator Well Treatment Fluid

In some embodiments, a well treatment fluid for blocking excessive water production in a producing well includes an acidic nanosilica dispersion and a polyamine activator. The acidic nanosilica dispersion may include amorphous silicon dioxide and an aqueous medium. In some embodiments, the acidic nanosilica dispersion may be formed using water or other suitable aqueous mediums (for example, water and glycerin). For example, in some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the nanosilica dispersion may include a stabilizer of acetic acid. In other embodiments, the acidic nanosilica dispersion may include a stabilizer of a cationic polymer or a carboxylic acid. In some embodiments, the acidic nanosilica dispersion may have a pH of less than 7 before interaction with the polyamine activator. In some embodiments, for example, an acidic nanosilica dispersion stabilized by acetic acid has a pH in the range of 2 to 4 at 25° C., a specific gravity of 1.21 (g/ml) a viscosity of less than 30 cP at 25° C. In some embodiments, for example, an acidic nanosilica dispersion stabilized by a cationic polymer has a pH in the range of 2.5 to 4 at 25° C., a density of 1.21 (g/ml) a viscosity of less than 1000 cP at 25° C. In some embodiments, the nanosilica dispersion may be obtained from Evonik Corporation of Parsippany, N.J., USA.

The polyamine activator may be a polyethylene polyamine and may include diethylenetriamine, ethylenediamine, tetraethylenepetamine (TEPA), triethylentetramine, pentaethylenehexamine (PEHA), hexaethyleneheptamine (HEHA), or any combinations thereof. For example, in some embodiments the polyamine activator may be a mixture of tetraethylenepentamine, pentaethylenehexamine, and hexaethyleneheptamine. In other embodiments, other polyamines capable of destabilizing the acidic nanosilica dispersion to form gelled solid may be used. In some embodiments, the volumetric ratio of the acidic nanosilica dispersion to the polyamine activator may be in the range of about 100:1 to about 140:1. For example, in some embodiments, the volumetric ratio of the acidic nanosilica dispersion to the polyamine activator may be about 120:1. In some embodiments, the polyamine activator may be in an amount in the range of about 0.1 percent by volume of the total volume (v/v %) to about 20 v/v %

In some embodiments, the acidic nanosilica dispersion and polyamine activator treatment fluid may include additional materials. For example, in some embodiment the acidic nanosilica dispersion and polyamine activator treatment fluid may include calcium carbonate particles, fibers (such as polyester fibers, polypropylene fibers, starch fibers, polyketone fibers, ceramic fibers, glass fibers or nylon fibers), mica, graphite, or combinations thereof.

In some embodiments, the nanosilica dispersion and polyamine activator may be mixed to form a treatment fluid before use in a well. The resulting treatment fluid may be introduced into a treatment zone in a well, such as during a well treatment operation. For example, the nanosilica dispersion and polyamine activator treatment fluid may be pumped through a wellhead at a pump rate sufficient to position the well treatment fluid at the treatment zone. In some embodiments, the nanosilica dispersion and polyamine activator treatment fluid may be introduced using coiled tubing. After introducing the nanosilica dispersion and polyamine activator treatment fluid into the treatment zone, the nanosilica dispersion and the polyamine activator may be allowed to interact with the treatment zone for a contact period. For example, the contact period may be of a duration that enables the in-situ formation of a gelled solid as a result of the interaction between the nanosilica dispersion and the polyamine activator. The nanosilica dispersion and polyamine activator treatment fluid may alter the treatment zone to reduce or block water production by reducing the permeability of flow paths in the formation (such as by forming a gelled solid in or at the mouth of permeable paths).

In some embodiments, the contact period may be in the range of about 0.5 hours to about 24 hours. For example, in some embodiments the contact period may be about 16 hours. In some embodiments, the contact period may be selected based on the formation type of the treatment zone.

In some embodiments, the treatment fluid may be prepared at a well site, such as by mixing the nanosilica dispersion and polyamine activator to form the treatment fluid. The nanosilica dispersion and polyamine activator treatment fluid may be used in producing wells or injection wells. For example, the treatment zone may be a zone in a producing well. In some embodiments, the nanosilica dispersion and polyamine activator treatment fluid may be used in combination with secondary and tertiary flooding operations, such as water flooding. For example, the nanosilica dispersion treatment and polyamine activator fluid may be used to reduce or block flow of water or other fluid during secondary and tertiary flooding operations.

In some embodiments, the acidic nanosilica and polyamine activator dispersion treatment fluid may be used with one or more additional treatment fluids. For example, in some embodiments, an additional treatment fluid may be introduced into the treatment zone after introduction of the nanosilica dispersion and polyamine activator treatment fluid and the elapse of a period for interaction between the nanosilica dispersion and the polyamine activator of the treatment fluid.

As shown supra, the nanosilica dispersion and polyamine activator may form a gelled solid after a sufficient period. The polyamine activator may increase the rate of gelation of the nanosilica dispersion as compared to using the nanosilica dispersion alone as a well treatment. In some embodiments, the gelling of the nanosilica dispersion may be controlled by varying the concentration of the polyamine activator, and the gelling may be controlled by changing the pH of the treatment fluid. For example, increasing concentrations of the polyamine activator may increase the pH of the treatment fluid and increase the rate of gelation of the treatment fluid. Additionally, the polyamine activator exhibits no precipitation with the nanosilica dispersion at elevated temperature, thus enabling use of the treatment fluid as a single fluid without staged mixing of each component. Consequently, the delayed and controlled gelling of the nanosilica dispersion and polyamine activator treatment fluid may provide for easier pumping of the treatment fluid after mixing at the surface and before introduction to the treatment zone. The nanosilica dispersion and polyamine activator treatment fluid may be used at elevated temperatures in a wellbore such as, for example, 100° F. or greater, such as 300° F. In some embodiments, the alkaline nanosilica dispersion and polyamine activator LCM may be used in treatment zones having temperatures less than 100° F., but such embodiments may have a greater time period for formation of the gelled solid as compared to treatment zones having greater temperatures. Moreover, the environmentally friendly properties of the nanosilica dispersion and polyamine activator treatment fluid may minimize or prevent any environmental impact and effect on ecosystems, habitats, population, crops, and plants at or surrounding the drilling site where the nanosilica dispersion and polyamine activator treatment fluid is used.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of an acidic nanosilica dispersion and polyamine activators were prepared and tested. The examples include 1) an acidic nanosilica dispersion stabilized by acetic acid and a commercially available polyethylene polyamine mixture as an activator, 2) an acidic nanosilica dispersion stabilized by acetic acid and tetraethylenepentamine as an activator, and 3) an acidic nanosilica dispersion stabilized by a cationic polymer and the commercially available polyamine mixture as an activator.

The acidic nanosilica dispersion used in the first and second experiments described infra was IDISIL® LPH 35 manufactured by Evonik Corporation of Parsippany, N.J., USA. The properties of the nanosilica dispersion are described in Table 1:

TABLE 1

Properties of Nanosilica Dispersion Stabilized by Acetic Acid

| First nanosilica dispersion | |
|---|---|
| pH @ 25° C. | 2-4 |
| Specific Gravity (grams/milliliter (g/ml)) | 1.2 |
| Viscosity @ 25° C. (centipoise (cP)) | <30 |
| Stabilizer | Acetic Acid |
| Visual Appearance | White/Off White |

The acidic nanosilica dispersion was a milky liquid that was completely miscible in water and had the same evaporation rate as water.

The polyethylene polyamine activator was ETHYLENEAMINE E-100 manufactured by Huntsman Corporation of The Woodlands, Tex., USA. The ETHYLENEAMINE E-100 is formed from a mixture of tetraethylenepentamine (TEPA), pentaethylenehexamine (PEHA), hexaethyleneheptamine (HEHA), and greater molecular weight products and included a mixture of linear, cyclic, and branched products having a number-average molecular weight of about 250 grams/mole (g/mol) to about 350 g/mol. The general structure of ETHYLENEAMINE E-100 may be represented as $H_2NCH_2CH_2(NHCH_2CH_2)_xNH_2$ where x is equal to 3, 4, 5, and greater.

In a first experiment, 120 milliliters (ml) of the acidic nanosilica dispersion stabilized by acetic acid was added to an empty beaker. The initial pH of the acidic nanosilica dispersion was measured to be 3.7. Next, 1 ml of ETHYLENEAMINE E-100 was slowly added to the acidic nanosilica dispersion with constant stirring. The resultant pH of the nanosilica dispersion after the addition of 1 ml of ETHYLENEAMINE E-100 was measured to be 9.7.

Next, the mixture of the nanosilica dispersion with ETHYLENEAMINE E-100 was plated in a high temperature and high pressure (HTHP) aging cell. The cell was placed in an oven and static aged for 16 hours at 300° F. in to simulate downhole conditions.

After 16 hours of static aging at 300° F., the mixture of the nanosilica dispersion with ETHYLENEAMINE E-100 was converted into a gelled solid. FIG. 1 is a photograph 100 of the gelled solid formed by the mixture of the nanosilica dispersion with ETHYLENEAMINE E-100 after the static aging.

In a second experiment, 120 milliliters (ml) of the acidic nanosilica dispersion stabilized by acetic acid was added to an empty beaker. Next, 1 ml of tetraethylenepentamine was added to the acidic nanosilica dispersion. The mixture of the nanosilica dispersion with the tetraethylenepentamine was placed in a HTHP aging cell. The cell was placed in an oven and static aged for 16 hours at 300° F. to simulate downhole conditions.

Figure 2:
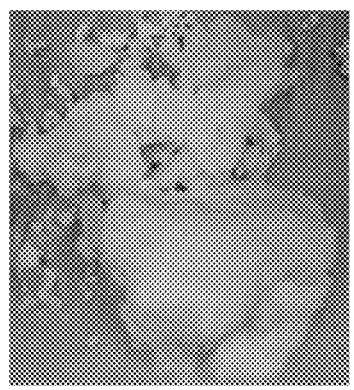
FIG. 2 is a photograph of a gelled solid formed by a mixture of an acidic nanosilica dispersion stabilized by acetic acid and a polyamine activator of tetraethylenepentamine in accordance with an embodiment of the disclosure.

After 16 hours of static aging at 300° F., the mixture of the nanosilica dispersion with the tetraethylenepentamine was converted into a gelled solid. FIG. 2 is a photograph 200 of the gelled solid formed by the mixture of the nanosilica dispersion with the tetraethylenepentamine.

As shown in FIGS. 1 and 2, the formation of the gelled solid after static aging at the elevated temperature of 300° F. shows that the acidic nanosilica dispersion can behave as an LCM when introduced with a polyethylene polyamine activator, such as ETHYLENEAMINE E-100 or tetraethylenepentamine.

A second acidic nanosilica dispersion used in the third experiment described infra was stabilized by a cationic polymer. The acidic nanosilica dispersion stabilized by a cationic polymer was Aerodisp® wk 341 manufactured by Evonik Corporation of Parsippany, N.J. The properties of the second acidic nanosilica dispersion are described in Table 2:

TABLE 2

Properties of Nanosilica Dispersion Stabilized by Cationic Polymer

| Second nanosilica dispersion | |
|---|---|
| pH @ 25° C. | 2.5-4 |
| Density (g/ml) | 1.2 |
| Viscosity @ 25° C. (cP) | <1000 |
| Stabilizer | Cationic polymer |

In a third experiment, 120 ml of the second acidic nanosilica dispersion stabilized by a cationic polymer was added to an empty beaker. Next, 1 ml of ETHYLENEAMINE E-100 was added to the acidic nanosilica dispersion. The mixture of the second acidic nanosilica dispersion with ETHYLENEAMINE E-100 was placed in a HTHP aging cell. The cell was placed in an oven and static aged for 16 hours at 300° F. to simulate downhole conditions.

Figure 3:
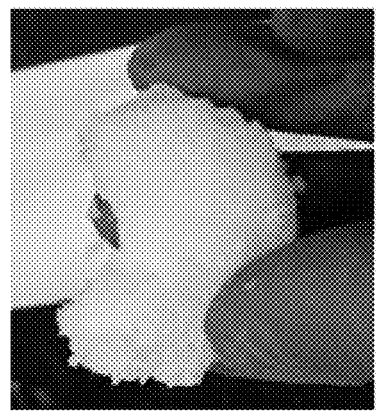
FIG. 3 is a photograph of a gelled solid formed by a mixture of an acidic nanosilica dispersion stabilized by a cationic polymer and a polyamine activator of ETHYLENEAMINE E-100 in accordance with an embodiment of the disclosure.

After 16 hours of static aging at 300° F., the mixture of the second acidic nanosilica dispersion with ETHYLENEAMINE E-100 was converted into a gelled solid. FIG. 3 is a photograph 300 of the gelled solid formed by the mixture of the nanosilica dispersion with ETHYLENEAMINE E-100. The formation of the gelled solid after static aging at the elevated temperature of 300° F. shows that an acidic nanosilica dispersion stabilized by a cationic polymer can behave as an LCM when introduced with a polyamine activator such as ETHYLENEAMINE E-100.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to reduce water production in a treatment zone in a wellbore, comprising:
introducing a treatment fluid into the wellbore such that the treatment fluid contacts the treatment zone and reduces the water production in the treatment zone, wherein the treatment fluid comprises an acidic nanosilica dispersion and a polyethylene polyamine.

2. The method of claim 1, wherein the treatment fluid consists of the acidic nanosilica dispersion and the polyethylene polyamine.

3. The method of claim 1, wherein the polyethylene polyamine comprises at least one of diethylenetriamine, ethylenediamine, tetraethylenepetamine (TEPA), triethylentetramine, pentaethylenehexamine (PEHA), and hexaethyleneheptamine (HEHA).

4. The method of claim 1, wherein the polyethylene polyamine comprises an amount in the range of 0.1 percent by volume of the total volume (v/v %) to 20 v/v %.

5. The method of claim 1, comprising maintaining the acidic nanosilica dispersion and the polyethylene polyamine in contact with the treatment zone for a period, such that the acidic nanosilica dispersion and the polyethylene polyamine form a gelled solid.

6. The method of claim 1, wherein the period comprises a range of 0.5 hours to 24 hours.

7. The method of claim 1, comprising mixing the acidic nanosilica dispersion and the polyethylene polyamine to form the treatment fluid at the surface before introducing the treatment fluid into the wellbore.

8. The method of claim 1, wherein the treatment fluid comprises at least one of calcium carbonate particles, fibers, mica, and graphite.

9. The method of claim 8, wherein the fibers comprise at least one of polyester fibers, polypropylene fibers, starch fibers, polyketone fibers, ceramic fibers, glass fibers or nylon fibers.

10. The method of claim 1, wherein the acidic nanosilica dispersion is stabilized by a cationic polymer.

11. The method of claim 1, wherein the acidic nanosilica dispersion is stabilized by a carboxylic acid.

12. The method of claim 1, wherein the acidic nanosilica dispersion is stabilized by acetic acid.

* * * * *